United States Patent [19]

Stastny

[11] Patent Number: 5,302,426
[45] Date of Patent: Apr. 12, 1994

[54] TRANSPIRATION COOLED CERAMIC FIBER SEAL

[75] Inventor: Edmund B. Stastny, Stuart

[73] Assignee: United Technologies Corporation, Hartford, Conn.

[21] Appl. No.: 760,290

[22] Filed: Sep. 16, 1991

[51] Int. Cl.$^5$ .................... B29D 22/00; B32B 1/08
[52] U.S. Cl. ................... 428/34.5; 428/34.7; 428/36.1; 428/265; 428/266
[58] Field of Search ........... 428/34.5, 34.7, 36.1, 428/265, 266

[56] References Cited

U.S. PATENT DOCUMENTS

| 4,086,736 | 5/1978 | Landrigan | 52/221 |
| 4,619,553 | 10/1986 | Fischer | 428/34.5 |
| 4,656,071 | 4/1987 | Virkar | 428/34.5 |
| 4,775,566 | 10/1988 | Landry et al. | 428/34.5 |
| 4,968,546 | 11/1990 | Takahashi | 428/36.3 |
| 5,071,685 | 12/1991 | Kasprzyk | 428/34.5 |
| 5,076,590 | 12/1991 | Steinetz et al. | 277/53 |
| 5,082,293 | 1/1992 | Steinetz et al. | 277/3 |

*Primary Examiner*—Donald P. Walsh
*Assistant Examiner*—Ngoclan T. Mai
*Attorney, Agent, or Firm*—Herbert W. Mylius

[57] ABSTRACT

Transpiration cooled ceramic fiber seals are provided for high temperature use, said seals providing transpiration cooling by passage of a cooling medium through controlled porosity.

20 Claims, No Drawings

TRANSPIRATION COOLED CERAMIC FIBER SEAL

The invention was made under a U.S. Government contract and the Government has rights herein.

BACKGROUND OF THE INVENTION

1. Field of the Invention

This invention relates to a ceramic seal capable of enduring high temperature environments and dynamic conditions. The invention is particularly directed to sealing gaps between moveable engine panels and adjacent engine sidewalls.

2. Description of the Prior Art

Many ceramic fiber sealing rings or gaskets are known in the prior art. Conventionally, these sealing materials comprise resilient ceramic fibers in the form of a fiber tow, randomly oriented, or in the form of a braided rope. Such ceramic seals are limited in their application by such factors as the operating temperature of the environment, frictional wear, vibrational factors, strength, and brittleness.

U.S. Pat. No. 5,014,917 to Sirocky et al describes a flexible thermal barrier seal for use at temperatures up to about 1370° C. The seal disclosed comprises a high temperature outer sheathing such as a braided ceramic fiber, surrounding a core of densely packed high temperature particles, e.g. particulate ceramic. The seal is highly flexible due to the particulate core, but highly temperature resistant due to the specific materials employed.

SUMMARY OF THE INVENTION

The present invention comprises a sealing material in the form of a hollow, circular cross-section tube or pipe of ceramic fiber material. The seal of this invention, moreover, is designed so as to expand and contract, and to move in compliance with the dynamic environment in which it is located with sufficient flexibility to seal against significantly distorted panels. Further, the seal is designed so as to carry a cooling medium, such as gaseous helium or hydrogen, in its interior, which coolant may be permitted to pass through the ceramic walls of the tubular seal so as to provide cooling to the surfaces in contact therewith. The seal comprises multiple layers of two or three dimensionally braided or woven flexible ceramic fibers, in the form of a tube or pipe, the inner surface of which is impregnated with a porous elastomer such as silicone.

DESCRIPTION OF THE PREFERRED EMBODIMENTS

A need exists for compliant, low leakage, dynamic seals capable of withstanding very high temperature environments, particularly those wherein a sliding engagement is present. In the past, moderately high temperature requirements have been met through the use of such materials as asbestos or ceramic fiber. Such materials, however, are unable to meet some of the requirements of modern high temperature engines, particularly in combustion areas. The present invention overcomes the problems of past attempts by incorporating transpiration cooling into the seal means, so as to provide a cooling effect in addition to the high temperature resistance of the ceramic fibers employed. While transpiration cooling may be achieved from one surface to the other of a flat, oval, dog-bone, circular, or otherwise formed solid seal or insulation barrier of ceramic fiber composition, the present invention is specifically directed to a seal means wherein gaseous coolant is passed from the interior to the exterior of a hollow body.

The basic seal of the present invention comprises a hollow, circular-cross section hose of braided or layered ceramic fiber. The primary features considered beneficial to the use of ceramic fibers are the availability of continuous filament fibers for simplified fabrication and for final product structural integrity, and chemical stability in the presence of combustion products. In addition, ceramic fibers provide the maximum working strength at minimum tow bundle size, in most instances. Still further, ceramic fibers permit the use of minimum fiber diameter (denier), enabling one to obtain tight tow bend radii, where required.

The preferred ceramic materials for this purpose comprise Nextel ® alumina-based fibers, available from the 3M Company. Nextel ® 440, for example, comprises 70% alumina, 28% silica, and 2% boric oxide. Nextel ® 312, the most preferred ceramic fiber, comprises 62% alumina, 24% silica, and 14% boric oxide. Such materials offer high operating temperature, e.g. in excess of about 1200° C., as well as resistance to chemical attack by either hydrogen or oxygen, while having low densities.

Other ceramic fibers are also suitable for use in this invention, and the selection of the specific material for use is dependent upon a number of factors. First, it is noted that continuous fibers are advantageous, and that smaller denier tows are preferred, so as to provide a more flexible fiber tow. Next, since one purpose of this invention is to provide a high temperature seal, it is obviously advantageous to provide a ceramic fiber having high strength at elevated temperatures. Further, a high tensile strain capability will result in a stronger and more reliable seal. Alumina-based fibers containing up to about 15 weight percent boric oxide and less than about 30 percent by weight silica are preferred. High silica content fibers are generally less desirable. Other fibers which have been found acceptable include Nicalon ®, available from Nippon-Dow, comprising 90% silicon carbide, 10% silica, and Tyranno ®, a family of silicon carbide and silica fibers containing titanium, available from Ube Industries and Textron.

The wall thickness of the braided hose will, of course, be dependent upon the size of the seal required for any given purpose, but may vary from about 0.10 to about 0.30 inches.

Porosity of such braided tubing is generally high, to the extent that gaseous coolant will flow at a high rate through the walls of the tubing. For use in transpiration cooling, it is desirable to control that flow of coolant material, so as to minimize storage requirements for the coolant material.

In the present invention, the flow of coolant material through the sidewalls of the seal material may be controlled by impregnating the ceramic fibers, on the inside surface of the tube or pipe, with a silicone elastomer such as RTV 159, a vinyl methyl silicone with ferrous oxide filler, available from General Electric. Such elastomeric impregnants are preferably applied to the inside surface of the hollow seal, but may be applied to the outside surface as well. Silicone elastomers are the preferred impregnant for this purpose, due to their ability to withstand cryogenic temperatures such as encountered in contacting liquid/gaseous helium or hydrogen.

Silicone elastomers have been found to be superior to fluorocarbons in this respect.

Gases such as hydrogen and helium are capable of flowing easily through silicone elastomers due to their pieces of both coated and uncoated fabric were obtained and used to measure bulk density, apparent specific gravity, and apparent porosity. The values obtained for these measurements are given in Table II.

TABLE II

Properties of samples from a finely woven Nextel ® 312 fabric before and after coating with RTV 159.

| Sample Number | Coated/ Uncoated | Sample Dry Weight (g) | Apparent Specific Gravity | Bulk Density (g/cc) | Apparent Porosity |
|---|---|---|---|---|---|
| 1 | Uncoated | 0.13 | 2.59 | 0.73 | 71.7% |
| 2 | Uncoated | 0.11 | 2.48 | 0.80 | 67.6% |
| 3 | Uncoated | — | 2.50 | 0.76 | 61.0% |
| Average | Uncoated | 0.11 | 2.53 ± 0.06 | 0.77 ± 0.03 | 69.6% ± 2.9 |
| 1 | Coated | 0.35 | 1.82 | 1.03 | 43.0% |
| 2 | Coated | 0.40 | 1.86 | 1.07 | 42.6% |
| 3 | Coated | 0.32 | 1.84 | 0.94 | 48.9% |
| 4 | Coated | 0.30 | 1.89 | 1.00 | 47.1% |
| 5 | Coated | 0.23 | 1.82 | 1.02 | 43.9% |
| Average | Coated | — | 1.85 ± 0.03 | 1.01 ± 0.05 | 45.1% ± 2.8 | porosity, but such elastomers do block a significant portion of the flow of hydrogen and helium which would normally pass through the ceramic fibers. Minimizing this flow of coolant is critical due to tankage requirements for the coolant material. Thus, a balance must be achieved between the cooling effect to be obtained and the amount of cooling material available. Factors in achieving this balance include the overall membrane thickness, the weave of the ceramic fibers, the denier of the fibers, the braid angle of the seal, the depth of elastomer penetration into the ceramic fiber matrix, and variations in composition of both the ceramic and the elastomeric materials. In addition, coolant temperature and pressure may be varied in use, as well as the choice of gas utilized. Thus, a multitude of variables are to be considered in the formulation of the seal of the present invention.

A number of Nextel ® 312 fabric samples were tested for permeability to helium, both with a surface coating of silicone elastomer and without. The procedure (ASTM C20) for determining the physical properties of the fabric samples was first investigated for reproducibility by analyzing four samples cut from a piece of finely woven Nextel ® fabric. Table I sets forth the results from the testing and the dry weight of the sample specimens.

TABLE I

Properties of samples from a finely woven Nextal ® 312 fabric.

| Sample Number | Sample Dry Weight (g) | Apparent Specific Gravity | Bulk Density (g/cc) | Apparent Porosity |
|---|---|---|---|---|
| 1 | 0.22 | 2.73 | 1.05 | 61.5% |
| 2 | 0.21 | 2.73 | 1.07 | 60.9% |
| 3 | 0.17 | 2.70 | 1.02 | 62.3% |
| 4 | 0.21 | 2.74 | 1.07 | 61.0% |
| Average | — | 2.73 ± 0.02 | 1.05 ± 0.02 | 61.4% ± 0.6 |

A 5 inch by 36 inch piece of similarly woven Nextel ® fabric was then coated with RTV 159 silicone elastomer, by spraying a 25 weight percent solution thereof in methyl ethyl ketone onto one surface of the fabric, using six spray passes across the fabric strip. The elastomer coated strip was cured by exposure to 90% humidity at 100° F. in a humidity chamber for four days. After completion of the curing, a 4 inch diameter circle test specimen was cut for the flow test rig. A similar specimen of uncoated fabric was also cut and tested to establish a baseline flow rate for the fabric itself. Small Five inch squares were masked off at each end of the remaining coated fabric strip, and sprayed a second time with the RTV 159 solution. The second coat was applied in two passes, directly over the first coat on one sample, and on the opposite side of the fabric on the second sample. After curing as above, flow test specimens were cut from the 5 inch squares. Table III contains the values of the physical properties determined for these doubly coated specimens.

TABLE III

Properties of Nextel ® fabric with second coat of RTV 159.

| Sample Number | Sample Dry Weight (g) | Apparent Specific Gravity | Bulk Density (g/cc) | Apparent Porosity |
|---|---|---|---|---|
| 2nd Coat Applied Over 1st Coat: | | | | |
| 1 | 0.60 | 1.68 | 1.23 | 26.9% |
| 2 | 0.38 | 1.67 | 1.16 | 30.7% |
| 3 | 0.35 | 1.69 | 1.22 | 28.1% |
| 4 | 0.36 | 1.65 | 1.15 | 30.0% |
| 5 | 0.33 | 1.63 | 1.13 | 30.9% |
| 6 | 0.35 | 1.65 | 1.16 | 29.5% |
| 7 | 0.28 | 1.67 | 1.16 | 30.4% |
| Average | — | 1.66 ± 0.02 | 1.17 ± 0.04 | 29.5% ± 1.5 |
| 2nd Coat Applied Opposite 1st Coat: | | | | |
| 1 | 0.48 | 1.62 | 1.24 | 23.4% |
| 2 | 0.45 | 1.62 | 1.23 | 24.0% |
| 3 | 0.46 | 1.62 | 1.26 | 23.1% |
| 4 | 0.28 | 1.67 | 1.24 | 26.1% |
| 5 | 0.28 | 1.61 | 1.27 | 21.0% |
| 6 | 0.23 | 1.63 | 1.26 | 22.4% |
| Average | — | 1.63 ± 0.02 | 1.25 ± 0.02 | 23.2% ± 1.8 |

A seal in accordance with the present invention is prepared by weaving/braiding a hollow tube of Nextel ® 312 ceramic fiber, having an outside diameter of 1.0 inch and an inside diameter of 0.625 inch. The tube is then subjected to heat cleaning at about 1000° F. for about 12 hours to remove organic polymer sizing used as an aid in weaving. After cleaning, the material is subjected to heat treatment at a temperature of about 1688° F. for about 12 hours. The inside surface of this heat treated tube is then impregnated to a depth of about 0.075 inch with RTV 159 liquid silicone elastomer. The elastomeric coating is then cured at room temperature and 50% relative humidity, for about 24 hours. The tube is found to be very flexible, and fits into a U-shaped channel opposite a moving surface which slides relative to the open face of said channel. When gaseous helium is passed through the tube at room temperature and a pressure of 85 psi, helium transpiration through the seal is observed. Transpiration cooling is determined in accordance with the environment in which the seal is utilized. Appropriate gas temperature and pressures will be determined for the extent of transpiration cooling required, and are within the skill of the practitioners to determine.

It is to be understood that the above description of the present invention is susceptible to considerable modification, change, and adaptation by those skilled in the art, and that such modifications, changes, and adaptations are to be considered within the scope of the invention, which is set forth by the appended claims.

What is claimed is:

1. A flexible high temperature transpiration seal for use at temperatures in excess of 1200° C., comprising a ceramic fiber insulation barrier having controlled porosity, said barrier being a tubular hollow body suitable for carrying a gaseous cooling medium, said hollow body having a coating on at least one surface thereof of an elastomeric material serving to reduce the porosity of said insulation carrier, thereby limiting the transpiration of said gaseous cooling medium from the interior to the exterior of said hollow body.

2. A seal as set forth in claim 1, wherein said hollow body has elastomeric material on the inside surface.

3. A seal as set forth in claim 2, wherein said elastomeric material is a silicone elastomer.

4. A seal as set forth in claim 3, wherein said ceramic fiber is an alumina-based fiber containing boric oxide.

5. A seal as set forth in claim 4, wherein said ceramic fiber comprises alumina, silica, and boric oxide.

6. A seal as set forth in claim 5, wherein said ceramic fiber comprises alumina, less than about 30 weight percent silica, and up to about 15 weight percent boric oxide.

7. A seal as set forth in claim 6, wherein said ceramic fiber is about 62 % alumina, 24% silica, and 14% boric oxide.

8. A seal as set forth in claim 6, wherein said ceramic fiber is about 70% alumina, 28% silica, and 2% boric oxide.

9. A seal as set forth in claim 3, wherein said ceramic fiber comprises silicon carbide and silica.

10. A seal as set forth in claim 9, wherein said ceramic fiber further comprises titanium.

11. A transpiration seal for high temperature utility comprising a woven hollow ceramic body suitable for carrying a gaseous coolant medium selected from hydrogen and helium, said hollow body having controlled porosity and a silicone elastomer on at least the inner surface thereof.

12. A seal as set forth in claim 11, wherein said ceramic body comprises woven ceramic fibers.

13. A seal as set forth in claim 12, wherein said ceramic fibers are alumina-based.

14. A seal as set forth in claim 13, wherein said alumina-based fibers contain boric oxide.

15. A seal as set forth in claim 14, wherein said fibers comprise alumina, silica, and boric oxide.

16. A seal as set forth in claim 15, wherein said fibers comprise alumina, less than about 30 weight percent silica, and up to about 15 weight percent boric oxide.

17. A seal as set forth in claim 16, wherein said fibers comprise about 62% alumina, 24% silica, and 14% boric oxide.

18. A seal as set forth in claim 16, wherein said fibers comprise about 70% alumina, 28% silica, and 2% boric oxide.

19. A seal as set forth in claim 16, wherein said silicone elastomer comprises a vinyl methyl silicone.

20. A flexible seal for high temperature environments comprising a hollow tubular woven ceramic body adapted for the transpiration of a cooling medium, said hollow body having at least the inner surface thereof coated with an elastomeric material to reduce the porosity thereof, said ceramic body being woven of alumina-based fibers containing boric oxide.

* * * * *

UNITED STATES PATENT AND TRADEMARK OFFICE
CERTIFICATE OF CORRECTION

PATENT NO. : 5,302,426
DATED : April 12, 1994
INVENTOR(S) : Edmund B. Stastny

It is certified that error appears in the above-identified patent and that said Letters Patent is hereby corrected as shown below:

Item [75],
On the title page, change "Inventor: Edmund B. Stastny, Stuart" to
--Inventor: Edmund B. Stastny, Stuart, Florida--.

In column 1, line 61, change "modem" to --modern--.

Signed and Sealed this

Ninth Day of August, 1994

Attest:

BRUCE LEHMAN

Attesting Officer

Commissioner of Patents and Trademarks